United States Patent [19]
Ferster

[11] Patent Number: 5,559,562
[45] Date of Patent: Sep. 24, 1996

[54] MPEG EDITOR METHOD AND APPARATUS

[76] Inventor: William Ferster, 4928 Reservoir Rd., N.W., Washington, D.C. 20007

[21] Appl. No.: 332,876

[22] Filed: Nov. 1, 1994

[51] Int. Cl.⁶ .................................................. H04N 7/50
[52] U.S. Cl. .................................. 348/584; 348/426
[58] Field of Search .................................. 348/403, 722, 348/409, 584, 415, 426, 432; H04N 7/50

[56] References Cited

U.S. PATENT DOCUMENTS

| | | | |
|---|---|---|---|
| 4,868,660 | 9/1989 | Rufray | 358/181 |
| 5,016,119 | 5/1991 | Ogawa et al. | 360/10.3 |
| 5,029,021 | 7/1991 | Yamamoto et al. | 360/14.1 |
| 5,111,292 | 5/1992 | Kuriacose et al. | 348/403 |
| 5,164,839 | 11/1992 | Lang | 358/335 |
| 5,175,626 | 12/1992 | White | 358/191.1 |
| 5,181,111 | 1/1993 | Hedley et al. | 358/140 |
| 5,191,436 | 3/1993 | Yonemitsu | 358/335 |
| 5,228,859 | 7/1993 | Rowe | 434/118 |
| 5,245,436 | 9/1993 | Alattar | 348/403 |
| 5,267,334 | 11/1993 | Normille et al. | 328/56 |
| 5,289,276 | 2/1994 | Siracusa | 348/403 |
| 5,305,438 | 4/1994 | MacKay et al. | 395/164 |
| 5,309,528 | 5/1994 | Rosen et al. | 328/58 |
| 5,315,326 | 5/1994 | Sugiyama | 348/415 |
| 5,410,354 | 4/1995 | Uz | 348/426 |

Primary Examiner—Victor R. Kostak
Attorney, Agent, or Firm—Fish & Richardson P.C.

[57] ABSTRACT

A method and apparatus for editing MPEG formatted image representative electrical signals provides a first decoder and storage for storing components of a first MPEG formatted stream of image data, a second decoder and storage for storing components of a second MPEG formatted stream of image data, and transition circuitry responsive to a transition position value, which designates where the transition is to begin, for generating an edited video stream which represents the transitioning from the first video sequence to the second video sequence. Different transition formats can be effected, including for example, an abrupt transition, a dissolve, or DVE.

14 Claims, 2 Drawing Sheets

MPEG EDITOR METHOD AND APPARATUS

BACKGROUND OF THE INVENTION

The invention relates generally to an apparatus and method for editing video image sequences, and more particularly, to a method and apparatus for editing video material encoded using an MPEG video standard.

The acceptance of MPEG as a standard for the distribution of video is becoming more and more apparent as time goes on. From feature film distribution, multimedia, source footage archiving, and commercial insertion to general video transmission, MPEG has emerged as a clear winner in the standards race. Just as importantly, specialized chips have been and are being developed for MPEG encoders and decoders to ensure that MPEG remains the leading contender in the standards race. Inexpensive decoder and encoder chips and chip sets are now available.

While MPEG has many good attributes, such as its low bandwidth requirements, it has one important drawback which prevents it from being as flexible as could be desired. This occurs because MPEG stores full images only every second or so and interpolates the inbetween frames thus making editing of MPEG coded scenes very difficult if not impossible. This deficiency came about because MPEG was originally assigned as a serial distribution standard, and the need to edit two image streams was not considered to be an important issue. Nevertheless, as more and more material is encoded in MPEG, there will be an ever increasing need to manipulate this footage.

It is therefore a primary object of the invention to edit two MPEG encoded image sequences in a smooth and seamless manner, at any point of the sequences. Other objects of the invention include a method and apparatus for editing the MPEG scenes which are relatively low in cost, reliable, and flexible in operation.

SUMMARY OF THE INVENTION

The invention relates to a method and apparatus for editing MPEG formatted image representative electrical signals, representative of two ongoing image sequences. The apparatus features a first storage for storing components of a first MPEG formatted stream of image data, a second storage mechanism for storing components of a second MPEG formatted stream of image data, and transition circuitry responsive to a transition position value, designating where the transition is to begin, for generating an edited video stream which represents the first MPEG formatted stream of image data prior to the transition position and at least in part the second MPEG formatted stream of image data subsequent to the image transition position.

In a preferred embodiment, the transition circuitry features a register for storing the transition position, a register for storing a value representative of a transition mode, a first frame reconstruction circuitry for reconstructing and playing a current frame first image for the first image data, a second frame reconstruction circuitry for reconstructing and playing a current frame second image for the second image data and selective addition circuitry for selectively adding, in response to the transition mode value and the transition position value, a first variable fraction of each current frame first image and a second variable fraction of a corresponding current frame second image to generate the edited video stream. Preferably the first and second fractions sum to one in value.

The method of the invention features the steps of storing components of a first MPEG formatted stream of image data, storing the components of a second MPEG formatted stream of image data, and generating, in response to a transition position value, an edited video stream of image data representing the first MPEG of image data prior to the transition position and at least in part, the second MPEG formatted stream of image data subsequent to the transition position.

The generating step of the method further features the steps of storing the transition position value, storing a transition mode designation value, reconstructing and storing a current frame first image for the first image data, reconstructing and storing a current frame second image for the second image data, and selectively adding, in response to the transmission mode designation and the transition position value, a first fraction of each current frame first image and a second fraction of a corresponding current frame second image to generate the edited video stream. Preferably the first and second fractions sum to one in value. The reconstructing steps each further feature the step of generating a said first or second current frame image using a previous key frame and all intervening updating frames.

BRIEF DESCRIPTION OF THE DRAWINGS

Other objects, features, and advantages of the invention shall be apparent from the following description taken together with the drawings in which.

DESCRIPTION OF A PREFERRED EMBODIMENT

Figure 1:
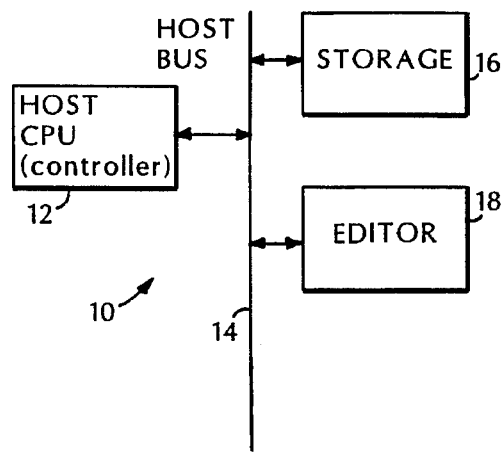
FIG. 1 is a system block diagram illustrating operation of the invention.

Referring to FIG. 1, a system for editing two MPEG formatted image representative coded streams has a host CPU or controller 12 connected and communicating over a host bus 14. A mass storage element such as magnetic disk or a large RAM storage memory 16 and an MPEG editor circuitry 18 connect to and communicate over the bus 14 both to communicate with each other as well as with the host controller 12. Functionally, the host controller controls operation of the editor circuitry 18 by identifying the location of the MPEG sequences to be edited, by providing data including the position at which the transition from one sequence to the next is the start, and by providing the particular style of transition to be employed. Different transitions can include, for example, an abrupt transition, a fade from the first sequence to the second sequence, a gradual overlay transition from the first sequence to the second sequence, etc.

In order to understand better the complexity of the MPEG transition, it is necessary to understand the MPEG compression format. MPEG achieves its high compression rates by storing full frames of the image only every so often, for example once per second. The full frames, called "key frames" or "I-frames" store the full frame exactly. Between the key frames or I-frames are the so-called B and P-frames which store only the differences between successive key frames. To decompress one of these difference frames, the encoder must have a running start from a known full frame, and must build succeeding frames from an earlier key frame.

This means that editing, absent some other mechanism such as that described herein, can only occur at the key frame location positions which are typically every 15 to 30 frames. This sort of granularity is too coarse for meaningful editing.

In accordance with the illustrated embodiment of the invention, the host CPU is a standard PC and the host bus is the PC bus. The editor, then becomes a peripheral card inserted into and in communications with the PC bus.

Since the data rates used in MPEG are very low, it is not necessary for the storage medium 16 to be a high performance disk drive such as a SCSI drive, and accordingly the storage medium can be taken from the Windows file system, either locally or from a networked source file. Since the networking will not be performed in real time, and hence is completely non-linear, the editing process can be instantly changed, rearranged, or otherwise controlled as desired.

Figure 2:
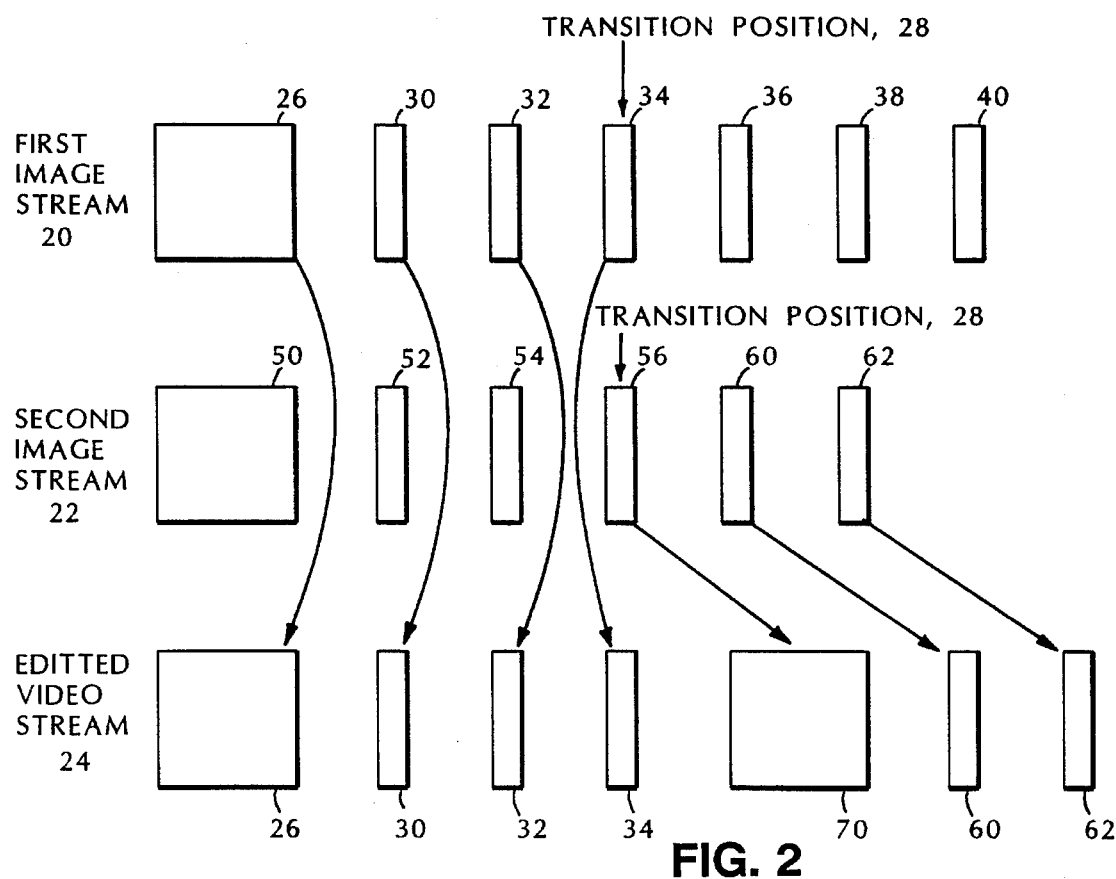
FIG. 2 is a frame-by-frame diagrammatic illustration of the MPEG editing process according to the invention.

Functionally, referring now to FIG. 2, a first MPEG image stream 20 is to be transitioned into a second MPEG image stream 22 with the resultant combined and transitioned video stream being identified by the reference numeral 24. According to the standards format, the first MPEG image stream has a key frame 26, the first key frame prior to a transition position 28, with subsequent B or P frames 30, 32, 34, 36, 38, and 40 being illustrated. The transition is to occur at difference frame 36 and the transition is assumed, in this example, to be an abrupt transition. Accordingly, the combined stream will include, from the first image stream, the full frame 26, and difference frames 30, 32, and 34, however difference frames 36, 38, and 40 will be lost and will not contribute to the resulting transitioned video stream 24.

The second image stream, has a full frame or key frame 50 followed by illustrated difference frames 52, 54, 56, 60, and 62. The key frame 50 is the first key frame of the second image stream 22 prior to the transition position 28. In the second image stream, the transition position corresponds to difference frame 56.

As noted above, the MPEG image format does not simply enable one to append difference frame 56 adjacent difference frame 34 of the first image stream and arrive at a acceptable or accurate resulting video image. Rather, a full frame must be used to replace difference frame 56 to provide a correct transition. Thus, the editor can take, as illustrated, full frame 26, and difference frames 30, 32, and 34, all occurring prior to the transition position; but at the transition position 28, the editor must replace, in the resulting video stream 24, difference frame 36 with a full frame 70. Full frame 70, in illustrated embodiment, is created by taking the previous full frame or key frame 50 in the second image stream 22 and reconstructing from it the full image corresponding to difference frame 56 (using, of course, difference frames 52 and 54). The full frame corresponding to difference frame 56, labeled frame 70 in the illustrated embodiment, is then inserted into the video stream after the frame corresponding to difference frame 34. Thereafter, difference frames 60 and 62 can be inserted into the video stream 24 since they will provide the correct differences relative to the previous frame represented by full frame 70. In essence, the image stream to which the transition is made, is given a running "head start" so that a full video frame will be available at the transition position rather than what, is simply a difference frame in normal MPEG format.

In other embodiments of the invention, for example where different transition modes are desired, various combinations of the first and second image streams 20 and 22 can be created. In that instance, it would be necessary to generate a full frame of both the first and second image streams at the transition position, to generate the new video frame at the transition position, the fractional parts of the first and second image frames respectively preferably summing to one.

Accordingly, should a dissolve be desired, the fractional part of the first image would decrease from one toward zero over a plurality of frames while the fractional part of the second part would increase from zero to one, preferable over the same plurality of frames. In one embodiment of the invention, the increase and decrease could be linear; however, that is neither required nor necessary as is well known to those in the art. In particular, after the full frame at the transition position has been generated, in accordance with a preferred embodiment of the invention, the editor can, if desired, work with the fractional differences provided by the MPEG format for the first and second image data streams respectively and simply add the respective fractions of those streams to generate corresponding frames in the edited video stream, representing the transitioned sequence. However, whenever a key frame is encountered in either the first or second input data streams, the editor must generate a new key frame for use with the output transitioned video stream to maintain the accuracy and fidelity of the output signal.

Figure 3:
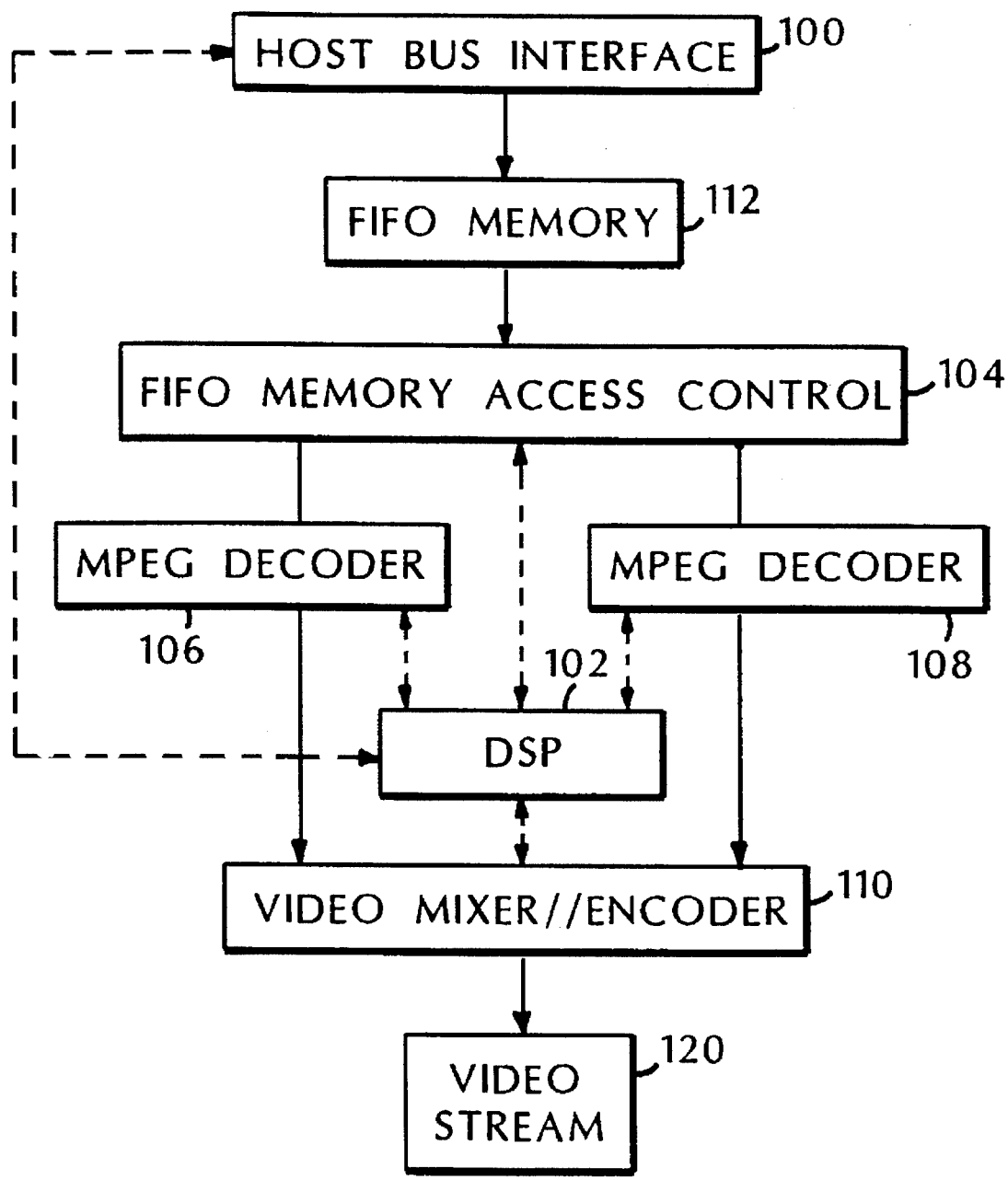
FIG. 3 is a more detailed block diagram illustrating the functional operation of the invention in accordance with a preferred embodiment.

In accordance with the preferred embodiment of the invention, referring to FIG. 3, a fifo memory 112 receives from the host bus interface the image data streams for the first and second data images respectively. Under the control of a digital signal processor 102, a fifo memory access control circuitry provides to a first MPEG decoder 106 and a second MPEG decoder 108, the image sequences which are to be transitioned one to the other. In this first instance, it is assumed that the data sequence from MPEG decoder 106 is to be transitioned into the data sequence provided by MPEG decoder 108. Under control of the digital signal processor 102, the MPEG decoder 106 plays its full frame, decoded, output video sequence and provides it to a mixer/encoder 110. The mixer/encoder receives that sequence, and prior to the transition point, and under the control of digital signal processor 102, encodes that sequence in, for example NTSC or PAL format, and transmits it as a video stream 120 for further operations, for example, transmittal, display, or storage. Prior to the beginning of the transition time period, the second MPEG decoder 108 is pre-cued to the nearest key frame before the desired transition starting point. The second decoder begins decompressing that second stream in time synchronism to the first image sequence, but without making it visible, while the first decoder is playing its image sequence. When the transition frame position is reached, however, the second encoder also begins playing (in the sense of making video available to mixer/encoder 110); and, under control of the digital signal processor according to the functions noted above, a seamless transition and edit from the first image sequence to the second image sequence can be accomplished.

Once the video stream from decoder 106 ceases playing, the decoder is then available to receive a new MPEG formatted data stream and to effect under the control of the digital signal processor, a transition from the video passing through MPEG decoder 108 to another image sequence to be provided by the fifo memory access control 104, from fifo memory 112, under control of the digital signal processor 102 to decoder 106. Accordingly, decoders 106 and 108 act to receive and transition successive sequences of frames, with the transitioning occurring first from decoder 106 to decoder 108, then from decoder 108 to 106, etc., in ping-pong fashion.

In accordance therefore with the preferred embodiment of the invention, the digital signal processor 102 is preprogrammed with the full details of the edit. In this manner, the digital signal processor 102 can control, through the host bus interface, the proper loading of fifo memory 112 with image data representing the sequences to be transitioned to/from. Thus, transitions including, for example, abrupt transitions, dissolves, and DVE can be effected seamlessly and transparently to the user.

Additions, deletions, and other modifications of the disclosed particular embodiments of the invention will be apparent to those in the art and are within the scope of the following claims.

What is claimed is:

1. Apparatus for editing MPEG formatted image representative electrical signals comprising first storage for storing components of a first MPEG formatted stream of image data, second storage for storing components of a second MPEG formatted stream of image data, transition circuitry responsive to a transition position value representing a transition position for generating an edited video stream of image data representing the first MPEG formatted stream of image data prior to the transition position and, at least in part, said second MPEG formatted stream of image data subsequent to said transition position, said transition circuitry comprising a register for storing said transition position value, a register for storing a transition mode, a first frame decoder circuitry for decoding and playing a current frame first image for said first image data, a second frame decoder circuitry for decoding and playing a current frame second image for said second image data, and selective addition circuitry for selectively adding, in response to said transition mode register value and said transition position register value, a first variable fraction of each current frame first image and a second variable fraction of a corresponding current frame second image to generate said edited video stream.

2. The apparatus of claim 1 wherein said first fraction and said second fraction sum to one in value.

3. The apparatus of claim 1 wherein each said decoder circuitry comprises an MPEG decoder circuitry for respectively generating a said first or second current frame image using a previous key frame and all intervening updating frames.

4. The apparatus of claim 3 wherein said transition circuitry further comprises an encoding circuitry for generating said edited video stream as an NTSC formatted signal.

5. The apparatus of claim 2 wherein said first fraction is zero and said second fraction is one.

6. The apparatus of claim 2 wherein said addition circuitry decreases the value of said first fraction over the range from one to zero over a plurality of frames, and increases the value of the second fraction over the range from zero to one.

7. Apparatus for editing MPEG formatted image representative electrical signals comprising a fifo memory for storing components of a first MPEG formatted stream of image data and a second MPEG formatted stream of image data, a fifo access control circuitry connected to the fifo memory for retrieving image data from the fifo memory, a first MPEG frame decoder circuitry for decoding and playing a current frame first image, a second MPEG frame decoder circuitry for decoding and playing a current frame second image, said first and second frame decoder circuitry each being connected to said fifo access control circuitry, an editor/encoder circuitry, connected to said first and second decoder circuities, a digital signal processor connected to said fifo memory, said fifo access control circuitry, said first and second MPEG decoders, and said editor/encoder circuitry for effecting, in response to control signals from a host computer over a host interface, the transitioning of a first image data sequence representing a first image video to a second data sequence representing a second image video.

8. The apparatus of claim 7 further comprising host interface circuitry connected to the first and second fifo memories, and to said digital signal processor, for transmitting image data and control information from a host processor and host memory to said other connected elements.

9. A method for editing MPEG formatted image representative electrical signals comprising the steps of storing components of a first MPEG formatted stream of image data, storing components of a second MPEG formatted stream of image data, and generating in response to a transition position value, representing a transition position, an edited video stream of image data representing the first MPEG formatted stream of image data prior to the transition position and, at least in part, said second MPEG formatted stream of image data subsequent to said transition position, wherein said generating step comprises the steps of storing said transition position value, storing a transition mode designation, decoding and playing a current frame first image for said first image data, decoding and playing a current frame second image for said second image data, and selectively adding, beginning at the transition position, in response to said transition mode designation value and the transition position value, a first variable fraction of each current frame first image and a second variable fraction of a corresponding current frame second image to generate said edited video stream.

10. The method of claim 9 wherein said first fraction and said second fraction sum to one in value.

11. The method of claim 9 wherein said decoding steps each comprise the step of generating a said first or second current frame image using a previous key frame and all intervening updating frames.

12. The method of claim 11 wherein said generating step comprises the step of generating said edited video stream as an NTSC formatted signal.

13. The method of claim 10 wherein said first fraction is zero and said second fraction is one.

14. The method of claim 10 wherein said first fraction decreases from one to zero during the processing of a plurality of frames and said second fraction increases from zero to one over a plurality of frames to effect a dissolve.

* * * * *

UNITED STATES PATENT AND TRADEMARK OFFICE
CERTIFICATE OF CORRECTION

PATENT NO.   : 5,559,562

DATED        : September 24, 1996

INVENTOR(S)  : William Ferster

It is certified that error appears in the above-identified patent and that said Letters Patent is hereby corrected as shown below:

Col. 3, ln. 40-- reads: arrive at "a" acceptable
should read: arrive "an" acceptable Col. 3, ln. 61-- reads: what, is simply
should read: what is simply Signed and Sealed this Second Day of December, 1997

Attest:

BRUCE LEHMAN

Attesting Officer

Commissioner of Patents and Trademarks